US006679206B2

(12) United States Patent
Takagi

(10) Patent No.: US 6,679,206 B2
(45) Date of Patent: Jan. 20, 2004

(54) VALVE CONDITION CONTROL SYSTEM FOR AN INTERNAL COMBUSTION ENGINE AND CONTROL METHOD THEREOF

(75) Inventor: Noboru Takagi, Toyota (JP)

(73) Assignee: Toyota Jidohsa Kabushiki Kaisha, Toyota (JP)

( * ) Notice: Subject to any disclaimer, the term of this patent is extended or adjusted under 35 U.S.C. 154(b) by 0 days.

(21) Appl. No.: 10/414,204

(22) Filed: Apr. 16, 2003

(65) Prior Publication Data

US 2003/0196619 A1 Oct. 23, 2003

(30) Foreign Application Priority Data

Apr. 22, 2002 (JP) ........................................ 2002-119352

(51) Int. Cl.$^7$ ................................................. F01L 1/34
(52) U.S. Cl. ............................... 123/90.15; 123/90.16; 123/90.17
(58) Field of Search ........................... 123/90.12, 90.15, 123/90.16, 90.17, 90.18, 90.31; 464/1, 2, 160; 74/568 R

(56) References Cited

U.S. PATENT DOCUMENTS 5,558,051 A * 9/1996 Yoshioka ................. 123/90.15
6,135,077 A * 10/2000 Moriya et al. ........... 123/90.17

FOREIGN PATENT DOCUMENTS

JP    A 11-218035    8/1999

\* cited by examiner

Primary Examiner—Thomas Denion
Assistant Examiner—Jaime Corrigan
(74) Attorney, Agent, or Firm—Oliff & Berridge, PLC

(57) ABSTRACT

The invention relates to valve condition control system and method for an internal combustion engine including a first variable valve drive mechanism for changing a valve condition of one of an intake valve and an exhaust valve, a second variable valve drive mechanism for changing a valve condition of the other of the intake valve and the exhaust valve, and a controller. The controller calculates a control amount of the first variable valve drive mechanism required for obtaining an appropriate valve condition of one of the intake and exhaust valves for an engine operation state as a target control amount of the first variable valve drive mechanism; calculates a target valve overlapping amount between the intake and exhaust valves in accordance with the engine operation state; calculates a target control amount of the second variable valve drive mechanism on the basis of an actual control amount of the first variable valve drive mechanism and the target valve overlapping amount; and controls an operation of each variable valve drive mechanism such that its actual control amount matches the target control amount.

18 Claims, 6 Drawing Sheets

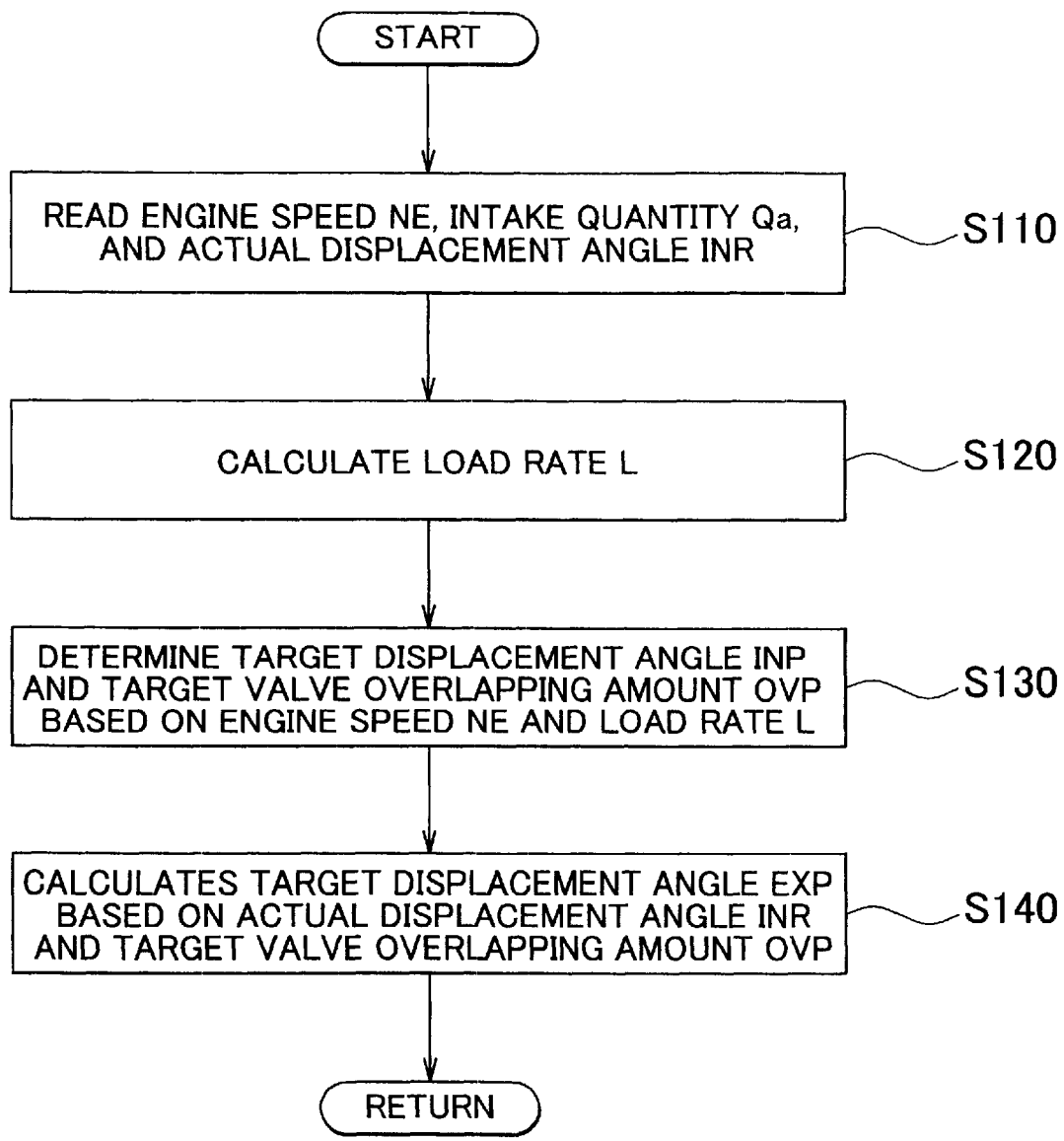

VALVE CONDITION CONTROL SYSTEM FOR AN INTERNAL COMBUSTION ENGINE AND CONTROL METHOD THEREOF

INCORPORATION BY REFERENCE

The disclosure of Japanese Patent Application No. 2002-119352 filed on Apr. 22, 2002, including the specification, drawings and abstract is incorporated herein by reference in its entirety.

BACKGROUND OF THE INVENTION

1. Field of Invention

The invention relates to a valve condition control system and a control method thereof for controlling intake and exhaust valves of an internal combustion engine. In particular, the invention relates to such control system and method that can advantageously be used with an internal combustion engine including variable valve drive mechanisms respectively provided to intake and exhaust valves and thus capable of changing the operation condition of each valve independently.

2. Description of Related Art

There is known a variable valve drive mechanism for changing conditions of intake and exhaust valves, such as valve timing (i.e., timing of opening/closing valves) and valve lift, in order to achieve increased engine output, reduced exhaust emissions, and so on. Especially, in the case of internal combustion engines to be mounted on vehicles, for example, a so-called VVT (Variable Valve Timing) mechanism capable of changing valve timings by changing the rotational phase of each camshaft relative to the crank shaft is widely used as the variable valve drive mechanism.

Besides, an internal combustion engine equipped with a so-called dual VVT system, as disclosed in Japanese Laid-open Patent Publication No. 11-218035, has been put into practice. This engine includes VVT mechanisms that are constructed on intake side camshaft and exhaust side camshaft respectively, and changes the valve timing of each intake or exhaust valve independently.

Conventionally, in an internal combustion engine provided with a valve condition control system incorporating such a dual VVT system, a valve timing appropriate for the engine operation state is separately calculated for the intake valve and the exhaust valve each, and the valve timing calculated is used as a target valve timing of each VVT mechanism. Then, the operation of each VVT mechanism is controlled such that its actual valve timing matches the target valve timing.

According to the valve condition control system including the dual VVT system constructed as described above, the valve timing of each intake or exhaust valve is set, through the aforementioned control, to a certain timing appropriate for the engine operation state. With such a conventional valve condition control system, however, failures or problems, as described in the following, may occur when valve timings are changed by the VVT mechanisms, so some improvements are required.

By the way, one object of valve condition control systems for an internal combustion engine is to adjust a "valve overlapping amount" between intake and exhaust valves. More specifically, by optimizing the valve overlapping amount according to the engine operation state, the internal EGR (Exhaust Gas Recirculation) amount in each cylinder is changed as required for reducing exhaust emissions.

In the conventional valve condition control system described above, such an optimization of valve overlapping amount is eventually accomplished after the target valve timing of each VVT mechanism is set to a timing required for achieving a most appropriate valve overlapping amount. However, after the target valve timing of each VVT mechanism is set, the most appropriate valve overlapping amount is not achieved until both the VVT mechanisms have been driven to the respective target timings, so it is difficult to assure a sufficient response speed in adjusting the valve overlapping amount. Therefore, especially under an engine operation state where the setting of valve overlapping amount largely influences exhaust emissions, and the like, problems, such as an increase in the exhaust emissions, may occur during such a time lag in bringing the actual valve timing to the target valve timing.

Furthermore, if the response speed of each VVT mechanism is different, problems, as described below, will further be caused. Even if the VVT mechanisms at the intake and exhaust sides have completely the same construction, the response speed tends to be different from each other owing to a different length of a passage for supplying oil pressures, and so on. Hereinafter, problems originating from such a difference in the response speed will be explained with reference to FIG. 7.

FIG. 7 represents a certain state of a valve timing control executed by the above-described conventional valve condition control system when controlling both intake and exhaust valves. This example shows the case where the response speed of the intake-side VVT mechanism is lower than that of the exhaust-side VVT mechanism. In the control state shown in FIG. 7, the valve timing of each VVT mechanism is to be changed towards the delay side while reducing the valve overlapping amount from a time point T.

First of all, at the time point T, target valve timings for the respective valves are calculated such that their valve timings change as mentioned above. Then, the valve timing of each valve begins to change to the delay side. At this time, however, the valve timing of the exhaust valve changes at a higher speed than the intake valve because of the difference in the response speed between the VVT mechanisms. Thus, the valve overlapping amount becomes in time larger and larger than before changing the valve timings.

When the valve timing of the exhaust valve reaches and stops at its target valve timing at the time point T1, the valve overlapping amount then starts to gradually reduce as the valve timing of the intake valve changes towards the delay side. Then, when the valve timing of the intake valve reaches and stops at its target valve timing at the time point T2, the valve-overlapping mount finally matches an amount required according to the engine operation state.

When the valve timings are changed in such a manner, it may cause such an unnecessary increase in the valve overlapping amount while changing the valve timings, and the valve overlapping amount may become temporarily larger than before changing the valve timings, although a required valve overlapping amount is eventually attained as described above. This contradicts the fact that the valve timings are changed so that the valve overlapping amount ultimately reduces. Upon such an unnecessary increase in the valve overlapping amount, the internal EGR amount in each cylinder becomes excessively large, which may increase hydrocarbons to be ejected from the internal combustion engine. Moreover, when the internal EGR amount becomes excessively large, the combustion temperature inappropriately lowers, or too much intake air passes through the combustion chamber from an intake passage to an exhaust passage, which may cause the engine combustion to become unstable, and which may even cause an engine stall in the worst case.

Conversely, if the response speed of each VVT mechanism is different and the valve timing of each valve is changed so as to increase the valve overlapping amount, it may happen that the valve overlapping amount unnecessarily reduces while changing the valve timings, and the valve overlapping amount thereby becomes smaller than before changing the valve timings. In this case, the internal ERG amount within the cylinder unnecessarily reduces, which may cause an inappropriate increase in the combustion temperature, an increase in NOx emissions, and so on.

Consequently, with such a conventional valve condition control system which merely uses a valve timing appropriate for the engine operation state as a target valve timing, the valve overlapping amount can not be always adjusted in an appropriate manner during the valve condition control. In the meantime, in the case of a valve condition control system including variable valve drive mechanism of other type than VVT mechanisms, and the like, for changing valve timings by changing relative phases of a camshaft, if that valve condition control system includes variable valve drive mechanisms constructed on both the intake and exhaust sides and is arranged to change the valve condition of each intake or exhaust valve independently, it may be subject to substantially the same problems as those described above.

SUMMARY OF THE INVENTION

In view of the above situation, the invention has been made to provide valve condition control system and method for maintaining an appropriate operation state of an internal combustion engine including variable valve drive mechanisms constructed on both the intake and exhaust sides while changing valve conditions.

To achieve the above object, a valve condition control system for an internal combustion engine is provided, which includes a first variable valve drive mechanism for changing a valve condition of one of an intake valve and an exhaust valve of the internal combustion engine; a second variable valve drive mechanism for changing a valve condition of the other of the intake valve and the exhaust valve; and a controller. The controller calculates the control amount of the first variable valve drive mechanism required for obtaining an appropriate valve condition of the one of the intake and exhaust valves for the engine operation state as a target control amount of the first variable valve drive mechanism; calculates a target valve overlapping amount between the intake and exhaust valves in accordance with the engine operation state; calculates a target control amount of the second variable valve drive mechanism on the basis of the actual control amount of the first variable valve drive mechanism and the target valve overlapping amount; and controls the operation of each variable valve drive mechanism such that its actual control amount matches the target control amount.

Also, one exemplary embodiment of the invention relates to a control method of a valve condition control system for an internal combustion engine including a first variable valve drive mechanism for changing a valve condition of one of an intake valve and an exhaust valve of the internal combustion engine and a second variable valve drive mechanism for changing a valve condition of the other of the intake valve and the exhaust valve. The valve condition control system is adapted to calculate a target control amount of each variable valve drive mechanism and to control the operation of each variable valve drive mechanism such that its actual control amount matches the target control amount. This control method includes the steps of: calculating a control amount of the first variable valve drive mechanism required for obtaining an appropriate valve condition of the one of the intake and exhaust valves for an engine operation state as a target control amount of the first variable valve drive mechanism;

calculating a target valve overlapping amount between the intake and exhaust valves in accordance with the engine operation state; and calculating the target control amount of the second variable valve drive mechanism on the basis of the actual control amount of the first variable valve drive mechanism and the target valve overlapping amount.

According to these control system and method, the target control amount of the second variable valve drive mechanism is calculated based on the actual control amount of the first variable valve drive mechanism and the target valve overlapping amount. Thus, the operation of the second variable valve drive mechanism is controlled so as to achieve the target valve overlapping amount. Therefore, it is possible to achieve a required valve overlapping amount before the changing of the valve condition is finished for both the intake and exhaust valves, which permits a faster adjustment of the valve overlapping amount.

With the above arrangement, also, the valve overlapping amount is always changed such that it approaches the target valve overlapping amount while changing valve conditions. Therefore, an unnecessary increase or reduction in the valve overlapping amount, which may otherwise be caused at the time of changing valve conditions, is avoided, whereby an appropriate engine operation state is maintained while changing the valve timings.

Another exemplary embodiment of the invention relates to a valve condition control system for an internal combustion engine including a first variable valve drive mechanism for changing a valve condition of one of an intake valve and an exhaust valve of the internal combustion engine; a second variable valve drive mechanism for changing a valve condition of the other of the intake valve and the exhaust valve; and a controller. The controller calculates a control amount of the first variable valve drive mechanism required for obtaining an appropriate valve condition of the one of the intake and exhaust valves for the engine operation state as a first target control amount of the first variable valve drive mechanism; calculates a target valve overlapping amount between the intake and exhaust valves in accordance with the engine operation state; calculates a first target control amount of the second variable valve drive mechanism on the basis of the actual control amount of the first variable valve drive mechanism and the target valve overlapping amount; calculates control amounts of the first and second variable valve drive mechanisms required for obtaining each appropriate valve condition of the valves for the engine operation state as second target control amounts; selects target control amounts of the first and second variable valve drive mechanisms from the first and second target control amounts of each of the first and second variable valve drive mechanisms in accordance with the engine operation state at the time of calculating target control amounts of the first and second variable valve drive mechanisms; and controls the operation of each variable valve drive mechanisms such that its actual control amount matches the target control amount calculated.

Another exemplary embodiment of the invention relates to a control method of a valve condition control system for an internal combustion engine including a first variable valve drive mechanism for changing a valve condition of one of an intake valve and an exhaust valve of the internal combustion engine and a second variable valve drive mechanism for changing a valve condition of the other of the intake valve and the exhaust valve. The valve condition control system calculates a target control amount of each variable valve drive mechanism and controls the operation of each variable valve drive mechanism such that its actual control amount matches the target control amount. This control method includes the steps of:

- calculating a control amount of the first variable valve drive mechanism required for obtaining an appropriate valve condition of one of the intake and exhaust valves for the engine operation state as a first target control amount of the first variable valve drive mechanism;
- calculating a target valve overlapping amount between the intake and exhaust valves in accordance with the engine operation state;
- calculating a first target control amount of the second variable valve drive mechanism on the basis of the actual control amount of the first variable valve drive mechanism and the target valve overlapping amount;
- calculating control amounts of the first and second variable valve drive mechanisms required for obtaining each appropriate valve condition of the valve for the engine operation state as second target control amounts; and
- selecting target control amounts of the first and second variable valve drive mechanisms from the first and second target control amounts of each of the first and second variable valve drive mechanisms in accordance with the engine operation state at the time of calculating target control amounts of the first and second variable valve drive mechanisms.

By the way, influences given to the engine operation state by such valve conditions may be roughly classified into those originating from the valve overlapping amount and those literally originating from the valve conditions, such as a timing for opening/closing the intake and exhaust valves.

According to the above-described control system and method, since the first target control amount of the second variable valve drive mechanism is calculated based on the actual control amount of the first variable valve drive mechanism and the target valve overlapping amount. When the target control amount of the second variable valve drive mechanism are calculated, the valve overlapping amounts can be quickly adjusted as aforementioned. Also, the valve overlapping amount is always changed such that it approaches the target valve overlapping amount while changing the valve conditions. Therefore, an unnecessary increase or reduction in the valve overlapping amount, which may otherwise be caused at the time of changing valve conditions, is avoided, whereby an appropriate engine operation state is maintained while changing the valve conditions.

On the other hand, a control amount of the second variable valve drive mechanism required for obtaining an appropriate valve condition for the engine operation state are calculated as the second target control amounts of the second variable valve mechanism. When the second target control amounts are selected as the target control amounts of the second variable valve drive mechanism, the valve condition of the valve, to be changed by the second variable valve drive mechanism, matches an appropriate valve condition for the engine operation state. That is, with the above control system and method, it is possible to quickly bring the valve condition of each valve to a valve condition required according to the engine operation state at the time of changing the valve conditions.

Namely, by switching means for calculating the target control amount of each variable valve drive mechanism according to the engine operation state, it is possible to maintain an appropriate engine operation state while changing the valve conditions.

BRIEF DESCRIPTION OF THE DRAWINGS

The above-mentioned exemplary embodiment and other exemplary embodiments, objects, features, advantages, technical and industrial significances of this invention will be better understood by reading the following detailed description of the exemplary embodiments of the invention, when considered in connection with the accompanying drawings, in which:

FIG. 3 is a flowchart showing a control procedure executed in a first embodiment of the invention when calculating the target valve timings;

DETAILED DESCRIPTION OF THE EXEMPLARY EMBODIMENTS

In the following description and the accompanying drawings, the invention will be described in more detail with reference to exemplary embodiments.

(First Embodiment)

First of all, a valve condition control system for an internal combustion engine according to a first embodiment of the invention will be described in detail with reference to FIGS. 1 to 4.

Figure 1:
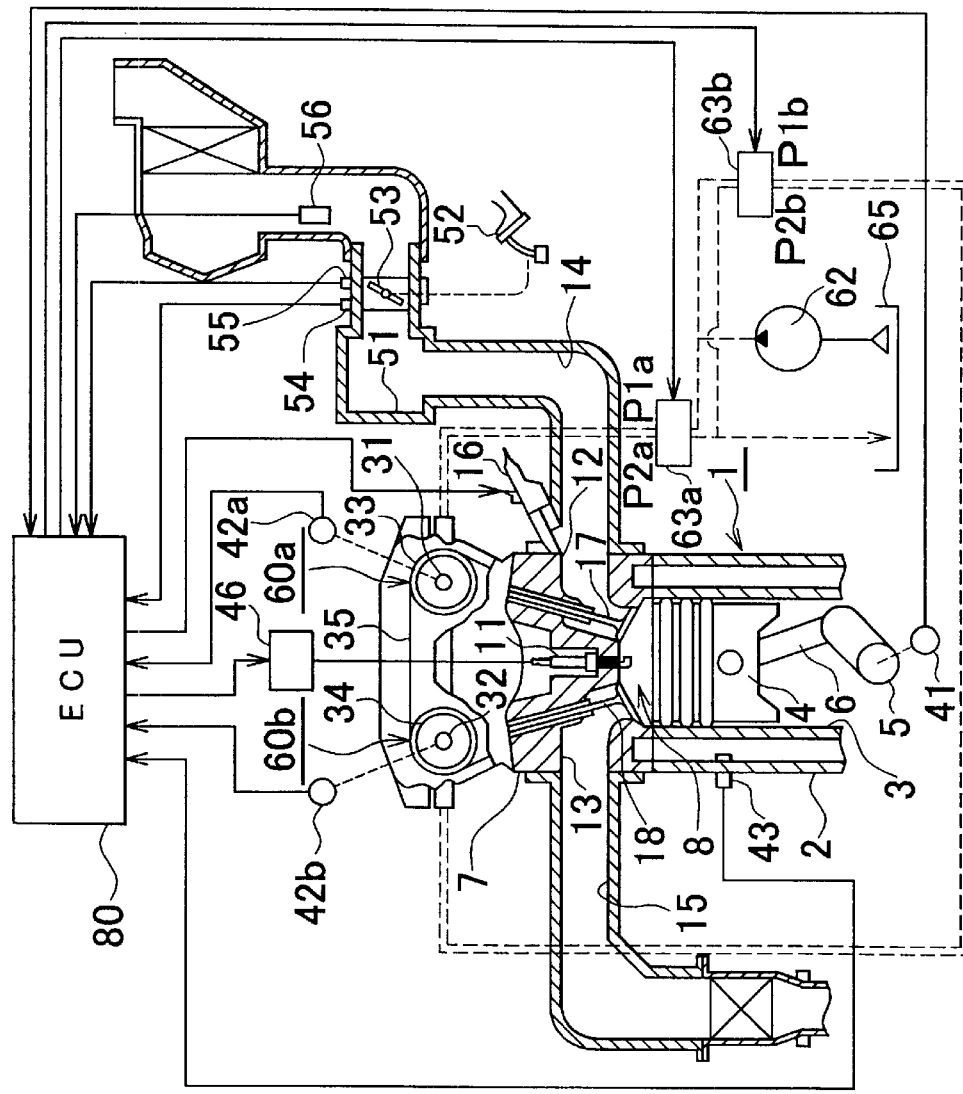
FIG. 1 is a view schematically showing the construction of a gasoline engine 1 incorporating a valve condition control system according to one embodiment of the invention.

FIG. 1 schematically shows a construction of a gasoline engine 1 incorporating the valve condition control system of the embodiment. A plurality of cylinders 3 are formed in a cylinder block 2 of the gasoline engine 1 (note that only one cylinder 3 is shown in FIG. 1). A piston 4 is disposed in each cylinder 3 and is connected to a crank shaft 5 via a connecting rod 6 such that a reciprocation of the piston 4 is converted into a rotation of the crank shaft 5 via the connecting rod 6.

A cylinder head 7 is mounted on the upper portion of the cylinder block 2. In the cylinder 3, a combustion chamber 8 is defined by the upper end of the piston 4 and the cylinder head 7.

Also, a spark plug 11 is disposed within the combustion chamber 8. An intake port 12 and an exhaust port 13 are arranged relative to the combustion chamber 8 and are connected to an intake passage 14 and an exhaust passage 15 respectively. An injector 16 for injecting fuel is arranged within the intake port 12 relative to the combustion chamber 8.

An intake valve 17 for opening/closing the intake port 12 and an exhaust valve 18 for opening/closing the exhaust port 13 are respectively arranged relative to the combustion chamber 8. In operation, the intake and exhaust valves 17, 18 open/close by being driven by rotations of cams (not shown) provided on intake-side and exhaust-side camshafts 31, 32 respectively. Namely, the valves 17, 18 open/close as the camshafts 31, 32 rotate. Timing pulleys 33, 34 are provided at ends of the camshafts 31, 32 respectively. The timing pulleys 33, 34 are connected to the crank shaft 5 via a timing belt 35 such that each pulley turns once for every two turns of the crank shaft 5. With this arrangement, when the gasoline engine 1 runs, the rotating force of the crank shaft 5 is transmitted to the intake-side and exhaust-side camshafts 31, 32 via the timing belt 35 and the timing pulleys 33, 34. Thus, the intake and exhaust valves 17, 18 are driven to open/close in synchronization with the rotation of the crank shaft 5. That is, they are driven at predetermined times in accordance with the reciprocation of the piston 4.

Furthermore, a crank angle sensor 41 is provided in the vicinity of the crank shaft 5. The crank angle sensor 41 is adapted to detect the rotational phase of the crank shaft 5 (i.e., a crank angle), and an engine speed NE of the gasoline engine 1 (i.e., a rotation speed of crank shaft 5) is determined according to the rotational phase detected. Also, a cam angle sensor 42a is disposed in the vicinity of the intake-side camshaft 31, and the rotational phase of the intake-side camshaft 31 (i.e., a cam angle) is determined based on signals output from the cam angle sensor 42a and the crank angle sensor 41. Likewise, another cam angle sensor 42b is disposed in the vicinity of the exhaust-side camshaft 32, and the rotational phase of the exhaust-side camshaft 32 (i.e., a cam angle) is determined based on signals output from the cam angle sensor 42b and the crank angle sensor 41.

An ignitor 46 is adapted to apply high voltage to the spark plug 11. Thus, an ignition timing of the spark plug 11 corresponds to a timing for outputting high voltage from the ignitor 46. When the gasoline engine 1 runs to generate an engine output, an air-fuel mixture constituted of intake air supplied via the intake passage 14 and a fuel injected from the injector 16 is ignited by the spark plug 11 and burns (explodes) within the combustion chamber 8, and the produced combustion gas is ejected into the exhaust passage 15.

A surge tank 51 for preventing or suppressing a pulsation of intake air is provided along a portion of the intake passage 14. A throttle valve 53 whose opening changes as an accelerator pedal 52 is operated is disposed upstream of the surge tank 51. The volume of air to be introduced into the combustion chamber 8 is adjusted by changing the opening of the throttle valve 53. Also, in the vicinity of the throttle valve 53, a throttle opening sensor 54 for detecting the opening of the crank shaft 5 and an idle switch 55 that is turned on when the throttle valve 53 is fully closed are disposed. Moreover, an airflow meter 56 whose output changes according to an intake quantity Qa, a quantity of air to be introduced into the gasoline engine 1, is disposed upstream of the throttle valve 53.

According to the embodiment, an intake-side variable valve timing mechanism (hereinafter will be referred to as an "IN-VVT mechanism") 60a is constructed with respect to the timing pulley 33 provided on the intake-side camshaft 31. Likewise, an exhaust-side variable valve timing mechanism (hereinafter will be referred to as an "EX-VVT mechanism") 60b is constructed with respect to the timing pulley 34 provided on the exhaust-side camshaft 32.

The IN-VVT mechanism 60a is arranged to continuously change a timing for opening/closing the intake valve 17 by changing a rotational phase of the timing pulley 33 and that of the intake-side camshaft 31 with respect to the crank shaft 5 using hydraulic pressure. Likewise, the EX-VVT mechanism 60b is arranged to continuously change a timing for opening/closing the exhaust valve 18 by changing a rotational phase of the timing pulley 34 and that of the exhaust-side camshaft 32 with respect to the crank shaft 5 using hydraulic pressure. The IN-VVT mechanism 60a is provided with an advance-side hydraulic passage P1a and a delay-side hydraulic passage P2a. The advance-side hydraulic passage P1a is used for supplying oil at the time of advancing the rotational phase of the intake-side camshaft 31 relative to that of the timing pulley 33, whereas the delay-side hydraulic passage P2a is used for supplying oil at the time of delaying the rotational phase of the intake-side camshaft 31 relative to that of the timing pulley 33. The EX-VVT mechanism 60b is provided with an advance-side hydraulic passage P1b and a delay-side hydraulic passage P2b. The advance-side hydraulic passage P1b is used for supplying oil at the time of advancing the rotational phase of the intake-side camshaft 32 relative to that of the timing pulley 34, whereas the delay-side hydraulic passage P2b is used for supplying oil at the time of delaying the rotational phase of the intake-side camshaft 32 relative to that of the timing pulley 34. The oil stored in an oil pan 65 is drawn into an oil pump 62 and is supplied to oil control valves (hereinafter will be referred to as "OCVs") 63a, 63b. These OCVs 63a, 63b are so-called linear solenoid valves and are capable of changing the destination and supply speed of the oil by changing a duty ratio of voltage to be applied to an electromagnetic solenoid embedded within each valve. Then, oil is supplied via the OCV 63a to either the advance-side hydraulic passage P1a or the delay-side hydraulic passage P2a, while oil is supplied via the OCV 63b to either the advance-side hydraulic passage P1b or the delay-side hydraulic passage P2b. Thus, by selectively supplying oil to each hydraulic passage, it is possible to change the rotational phase of each camshaft 31 or 32 with respect to the crank shaft 5 so that a valve timing of the valve 17 or 18 accordingly changes.

An electronic control unit (ECU) 80 is provided for performing various controls in the gasoline engine 1, such as an ignition timing control, a fuel injection amount control, and a valve timing control via the phase control by the VVT mechanisms, and so on. The ECU 80 includes a micro computer including a central processing unit (CPU) as its main component and other components, such as a read-only memory (ROM) in which various programs, maps, and the like, are previously stored, and a random access memory (RAM) for temporarily recording results of calculations executed by the CPU. Moreover, the ECU 80 is provided with a back-up RAM for saving calculation results, data previously stored, and the like, after the engine stops, an input interface, an output interface, and so on. The ECU 80 receives via the input interface signals output from the crank angle sensor 41, the cam angle sensor 42a, the cam angle sensor 42b, a water temperature sensor 43, the throttle opening sensor 54, the idle switch 55, the airflow meter 56, and so on, and the ECU 80 determines the operation state of the gasoline engine 1 based on those signals.

On the other hand, the output interface is connected to the injector 16, the ignitor 46, the OCV 63a, the OCV 63b, and so on, via corresponding drive circuits or the like. The ECU 80 controls as needed the injector 16, the ignitor 46, the OCV 63a (i.e., the IN-VVT mechanism 60a), the OCV 63b (i.e., the EX-VVT mechanism 60b), and other components based on the signals output from the respective sensors including the above-indicated sensors 41 to 43, 54 to 56, using control programs and initial data stored in the ROM.

Figure 2:
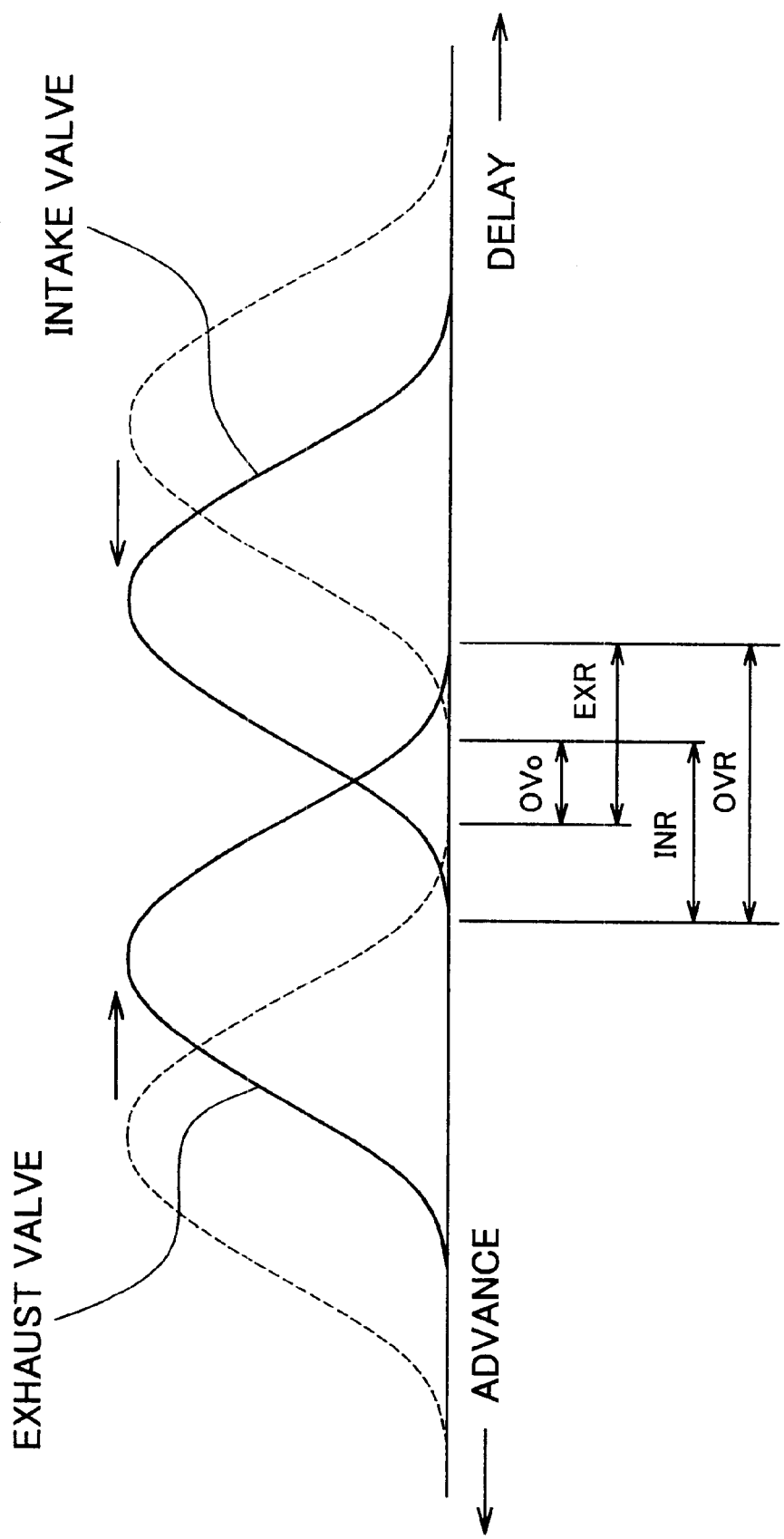
FIG. 2 is a view showing a relationship among the displacement angles of intake and exhaust valves and the valve overlapping amount.

Next, a control procedure executed by the valve condition control system of the embodiment for controlling valve timings will be described in detail with reference to FIGS. 2 to 4. In this embodiment, a target valve timing of the exhaust valve 18 is calculated from the actual valve timing of the intake valve 17 and a target valve overlapping amount. More specifically, a target displacement angle of the exhaust-side camshaft 32 is calculated based on the target valve overlapping amount determined in accordance with the engine operation state and the actual displacement angle of the intake-side camshaft 31.

Here, it is to be noted that "displacement angle" is a value representing a relative rotation amount of each camshaft with respect to the corresponding timing pulley, and is converted into a crank angle (° CA). In the embodiment, the actual displacement angles of the intake-side camshaft 31 and the exhaust-side camshaft 32 are calculated by the ECU 80 on the basis of the signals output from the cam angle sensors 42a, 42b, and the crank angle sensor 41. The displacement angle of the intake-side camshaft 31 is 0° CA when the valve timing of the intake valve 17 is most delayed. Thus, the actual displacement angle of the intake-side camshaft 31 is a value that represents how much the valve timing of the intake valve 17 advances than the most delayed timing. In the meantime, the displacement angle of the exhaust-side camshaft 32 is 0° CA when the valve timing of the exhaust valve 18 is most advanced. Thus, the actual displacement angle of the exhaust-side camshaft 32 is a value that represents how much the valve timing of the exhaust valve 18 delays than the most advanced timing.

Next, the relationship among these displacement angles and the valve overlapping amount will be described with reference to FIG. 2. In the embodiment, the valve overlapping amount obtained when both the displacement angle of the intake-side camshaft 31 and the displacement angle of the exhaust-side camshaft 32 are 0° CA is designated as an initial value $OV_0$ (i.e., −24° CA in the embodiment). Besides, the valve overlapping amount with which the intake valve 17 opens when the crank shaft 5 rotates by a predetermined angle of θ C after the exhaust valve 18 closes is −θ C. Also, the valve overlapping amount is represented as a crank angle (° CA). When the actual displacement angle of the intake-side camshaft 31 is represented by INR while the actual displacement angle of the exhaust-side camshaft 32 is represented by EXR, an actual valve overlapping amount OVR, as is understood from FIG. 2, can be represented by an expression (1) shown below:

$$OVR = INR + EXR + OV_0 \tag{1}$$

Subsequently, a procedure that is executed in the embodiment when calculating target valve timings will be described with reference to a flowchart of FIG. 3. Note that this procedure is executed by the ECU 80 at predetermined time intervals as an interrupt control procedure.

When the procedure starts, the engine speed NE calculated based on the output of the crank angle sensor 41, the intake quantity Qa calculated based on the output of the airflow meter 56, and the actual displacement angle INR of the intake-side camshaft 31 are first read (step S110). Note that the actual displacement angle INR represents the actual displacement angle of the intake-side camshaft 31 as aforementioned.

Then, a load rate L of the gasoline engine 1 under its present operation state is calculated (step S120). The load rate L is calculated by an expression (2) shown below:

$$L = Qa/Qwot \tag{2}$$

Here, note that "Qwot" is a predetermined constant representing the intake quantity under the maximum engine load.

Then, a target valve overlapping amount OVP and a target displacement angle INP of the intake-side camshaft 31 are determined on the basis of the engine speed NE and the load rate L using a map or maps stored in the ROM of the ECU 80 (step S130).

Next, a target displacement angle EXP of the exhaust-side camshaft 32 is calculated by an expression (3) shown below, using the determined target valve overlapping amount OVP and the actual displacement angle INR:

$$EXP = OVP - (INR + OV_0) \tag{3}$$

The expression (3) is obtained by reforming the expression (1), replacing the actual valve overlapping amount OVR with the target valve overlapping amount OVP and replacing the actual displacement angle EXR of the exhaust-side camshaft 32 with the target displacement angle EXP.

Afterwards, the processes in steps S110 to 140 are repeatedly executed at predetermined time intervals. Then the IN-VVT mechanism 60a is controlled such that the actual displacement angle INR of the intake-side camshaft 31 matches the target displacement angle INP determined in the above-described procedure. In this control, more specifically, the actual displacement angle INR is controlled to the target displacement angle INP by setting the duty ratio of voltage to be applied to the OCV 63a in accordance with a deviation between the actual displacement angle INR and the target displacement angle INP. At this time, the EX-VVT mechanism 60b is also controlled in the same manner.

Figure 4A:
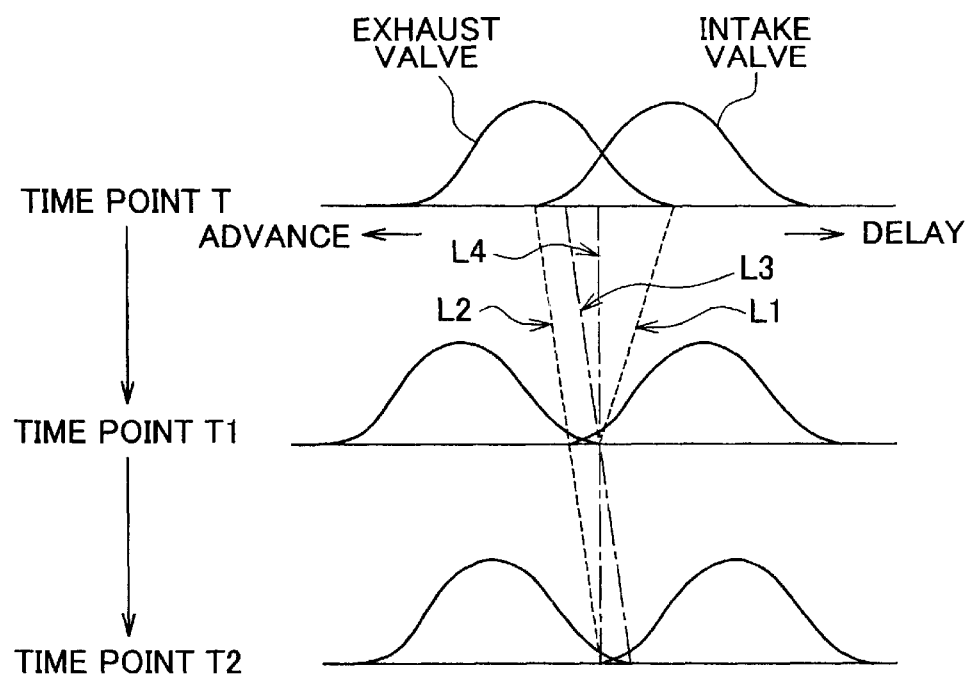
FIGS. 4a and 4b are views each showing a state of the valve timing control performed by the valve condition control system of the first embodiment when controlling the valve timings of the intake and exhaust valves.
Figure 4B:
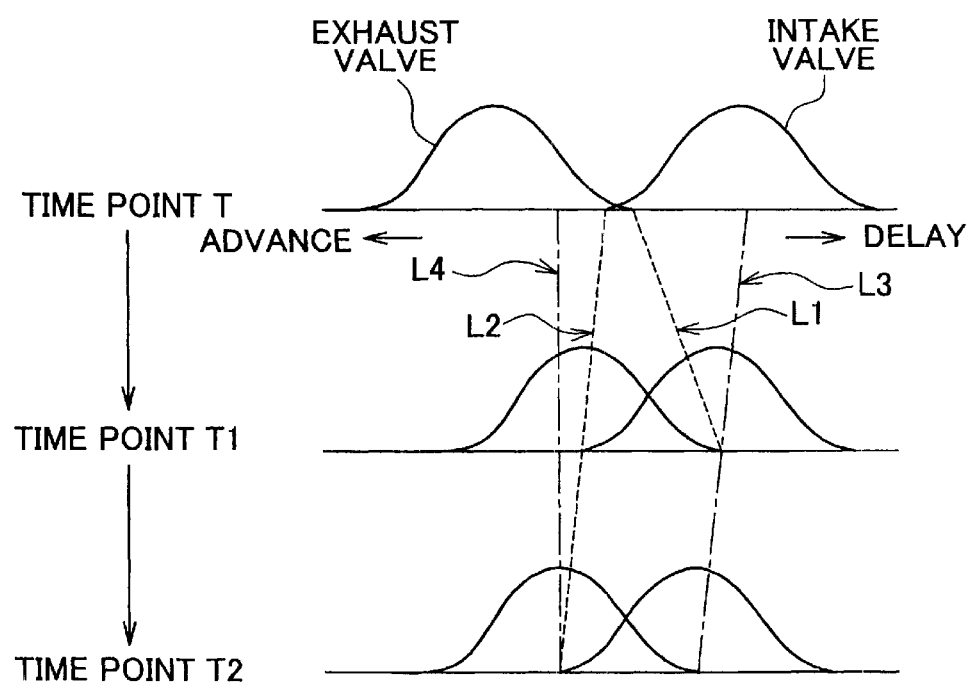

Next, an operation of the valve condition control system of the embodiment corresponding to the target valve timing calculation procedure described above will be explained. FIG. 4a shows a certain state of the valve timing control where the valve overlapping amount between the intake and exhaust valves 17, 18 is reduced by delaying the valve timing of the intake valve 17 while advancing the valve timing of the exhaust valve 18. In FIGS. 4a and 4b, a line L1 represents changes in a valve closing time of the exhaust valve 18 (i.e., crank angle) corresponding to the actual displacement angle EXR, namely changes in the valve closing time of the exhaust valve 18 corresponding to the actual displacement angle EXR of the exhaust-side camshaft 32. A line L2 represents changes in a valve opening time of the intake valve 17 (i.e., crank angle). A line L3 represents changes in the valve closing time of the exhaust valve 18 corresponding to the target displacement angle EXP, namely changes in the valve closing time of the exhaust valve 18 achieved when the rotational phase of the exhaust-side camshaft 32 matches the target displacement angle EXP. A line L4 represents changes in the valve opening time of the intake valve 17 corresponding to the target displacement angle INP.

Here, it is assumed that a request for changing valve timings is made at a time point T to reduce the valve overlapping amount between the valves 17, 18 by changing the valve timing of the intake valve 17 towards the delay side and changing the valve timing of the exhaust valve 18 towards the advance side respectively. Then, the target displacement angle INP of the intake-side camshaft 31 is calculated such that it becomes closer to the delay side than the actual displacement angle INR, and the target valve overlapping amount OVP is calculated such that it becomes smaller than the present amount.

Besides, the target displacement angle EXP of the exhaust-side camshaft 32 is calculated based on the calculated target valve overlapping amount OVP and the present actual displacement angle INR of the intake-side camshaft 31. Here, the actual displacement angle INR of the intake-side camshaft 31 is still closer to the advance side than its target displacement angle INP. Therefore, the target displacement angle EXP of the exhaust-side camshaft 32 is calculated such that it becomes closer to the advance side than the target displacement angle INP of the intake-side camshaft 31 and a displacement angle of the exhaust-side camshaft 32 which will be ultimately targeted in accordance with the target valve overlapping amount OVP.

Subsequently, the IN-VVT mechanism 60a and the EX-VVT mechanism 60b are respectively controlled based on the target displacement angles INP, EXP calculated as above, whereby the actual displacement angles INR, EXR of the respective camshafts 31, 32 begin to change accordingly. At this time, the actual displacement angle INR of the intake-side camshaft 31 changes towards the delay side while the actual displacement angle EXR of the exhaust-side camshaft 32 changes towards the advance side. Also, the target displacement angle EXP of the exhaust-side camshaft 32 changes towards the delay side in synchronization with the actual displacement angle INR of the intake-side camshaft 31 changing towards the delay side. That is, even after the actual displacement angle EXR of the exhaust-side camshaft 32 has reached the target displacement angle EXP, the phase of the exhaust-side camshaft 32 keeps changing as long as the phase of the intake-side camshaft 31 is still changing.

In this way, the phase of the exhaust-side camshaft 32 keeps changing towards the advance side until the actual displacement angle EXR reaches the target displacement angle EXP at a time point T1. Thus, the required valve overlapping amount is achieved before the phase change of the intake-side camshaft 31 ends.

Afterwards, the actual displacement angle INR of the intake-side camshaft 31 keeps changing towards the delay side until the actual displacement angle INR reaches the target displacement angle INP at the time point T2. During this change in the actual displacement angle INR, the target displacement angle EXP of the exhaust-side camshaft 32 also changes towards the delay side in synchronization as the actual displacement angle INR changes towards the delay side, whereby the required valve overlapping amount is continuously maintained.

FIG. 4b shows another state of the valve timing control where the valve overlapping amount is increased by changing the valve timing of the intake valve 17 towards the advance side while changing the valve timing of the exhaust valve 18 towards the delay side. Here, FIG. 4b shows the case where a valve timing change request is made at the time point T1 to increase the valve overlapping amount between the intake and exhaust valves 17, 18 by changing the valve timing of the intake valve 17 to the advance side while changing that of the exhaust valve 18 to the delay side. In this case, first of all, the target displacement angle INP of the intake-side camshaft 31 is calculated such that it becomes closer to the advance side than the actual displacement angle INR and the target valve overlapping amount OVP is calculated such that it becomes larger than the present amount according to the calculation procedure described above.

Besides, the target displacement angle EXP of the exhaust-side camshaft 32 is calculated based on the calculated target valve overlapping amount OVP and the present actual displacement angle INR of the intake-side camshaft 31. Here, the actual displacement angle INR of the intake-side camshaft 31 is still closer to the delay side than its target displacement angle INP. Therefore, the target displacement angle EXP of the exhaust-side camshaft 32 is calculated such that it becomes closer to the delay side than a displacement angle of the exhaust-side camshaft 32 which will be ultimately targeted in accordance with the target displacement angle INP of the intake-side camshaft 31 and the target valve overlapping amount OVP.

Subsequently, the IN-VVT mechanism 60a and the EX-VVT mechanism 60b are respectively controlled based on the target displacement angles INP, EXP calculated as above, whereby the actual displacement angles INR, EXR of the camshafts 31, 32 begin to change accordingly. At this time, the actual displacement angle INR of the intake-side camshaft 31 changes towards the advance side while the actual displacement angle EXR of the exhaust-side camshaft 32 changes towards the delay side. Also, the target displacement angle EXP of the exhaust-side camshaft 32 changes towards the advance side in synchronization with the actual displacement angle INR of the intake-side camshaft 31 changing towards the advance side. That is, even after the actual displacement angle EXR of the exhaust-side camshaft 32 has reached the target displacement angle EXP, the phase of the exhaust-side camshaft 32 keeps changing as long as the phase of the intake-side camshaft 31 is still changing. In this way, the phase of the exhaust-side camshaft 32 keeps changing towards the delay side until the actual displacement angle EXR reaches the target displacement angle EXP at the time point T1. Thus, the required valve overlapping amount is achieved before the phase change of the intake-side camshaft 31 ends.

Afterwards, the actual displacement angle INR of the intake-side camshaft 31 keeps changing towards the advance side until the actual displacement angle INR reaches the target displacement angle INP at the time point T2. During this change in the actual displacement angle INR, the target displacement angle EXP of the exhaust-side camshaft 32 also changes towards the advance side in synchronization as the actual displacement angle INR changes towards the advance side, whereby the required valve overlapping amount is continuously maintained.

By calculating target valve timings according to the above-described procedure, it is possible to achieve a required valve overlapping amount even before the changing of the valve timing of the intake valve 17 ends.

Also, according to the above-described procedure, the target displacement angle EXP of the exhaust-side camshaft 32 is always set to a displacement angle with which a required valve overlapping amount is achieved with respect to the present displacement angle of the intake-side camshaft 31. Thus, during the phase changes of the camshafts 31, 32, the valve overlapping amount is always changed such that it approaches the target valve overlapping amount.

Consequently, the following effects and advantages can be obtained with the valve condition control system of the embodiment.

(1) As described above, the target displacement angle EXP of the exhaust-side camshaft 32 is calculated from the target valve overlapping amount OVP determined based on the engine operation state and the actual displacement angle INR of the intake-side camshaft 31. With this arrangement, it is possible to achieve a required valve overlapping amount before the phase change of the intake-side camshaft 31 and that of the exhaust-side camshaft 32 both end, which permits a faster adjustment of the valve overlapping amount.

(2) In addition, during the phase changes, the valve overlapping amount is always changed such that it approaches the target valve overlapping amount. Therefore, an unnecessary increase or reduction in the valve overlapping amount, which may otherwise be caused at the time of changing valve timings, is avoided, whereby the engine operation state can be controlled in a more preferable fashion when the valve timings are being changed.

(Second Embodiment)

According to the first embodiment described above, when calculating the target valve timings, the target displacement angle EXP of the exhaust-side camshaft 32 changes every time the actual displacement angle INR of the intake-side camshaft 31 changes. Therefore, in the above-described calculation procedure, though the adjustment of the valve overlapping amount during the phase changes can be made faster, the phase change of the exhaust-side camshaft 32 does not end before the phase change of the intake-side camshaft 31 ends, so there may be a delay in changing the valve timing of the exhaust-side camshaft 32.

In the meantime, influences given to the engine operation state by valve timings may be roughly classified into those that originate from the valve overlapping amount and those that literally originate from the valve timings, namely which are the respective timings for opening/closing the intake and exhaust valves. For example, the valve overlapping amount is a dominant factor for determining an internal EGR quantity of each cylinder, whereas the timings for opening/closing valves are a dominant factor for determining a gas charge efficiency of each cylinder (i.e., efficiency in charging each cylinder with gas), and the like. For example, if the time to open the intake valve is delayed when the engine is running at a high engine speed under a large load, the gas charge efficiency improves due to the inertial force of intake air (gas). Moreover, the gas charge efficiency can be improved when the pressure in the exhaust port is made lower than the pressure in the intake port by setting the timing for opening/closing the exhaust valve and the exhaust system appropriately. Thus, when changing valve timings under such a specific state of the engine operation, the engine operation state may be improved more effectively by achieving an ultimate target valve timing, than by achieving a target valve overlapping amount.

In the second embodiment, therefore, a first calculation algorithm corresponding to first target calculating means and a second calculation algorithm corresponding to second target calculating means, namely two calculation algorithms are employed for calculating the target displacement angle EXP of the exhaust-side camshaft 32. These two calculation algorithms are selectively used in accordance with the engine operation state.

The first calculation algorithm is formulated such that the target displacement angle EXP of the exhaust-side camshaft 32 is calculated based on the target valve overlapping amount OVP and the actual displacement angle INR of the intake-side camshaft 31, as in the first embodiment. That is, according to this calculation algorithm, the target valve timing of the exhaust valve 18 is set so as to achieve a required valve overlapping amount with respect to the present valve timing of the intake valve 17.

On the other hand, the second calculation algorithm is formulated such that the target displacement angle EXP of the exhaust-side camshaft 32 is calculated based on the target valve overlapping amount OVP and the target displacement angle INP of the intake-side camshaft 31. That is, according to this calculation algorithm, a valve timing of the exhaust valve 18 to be ultimately targeted, namely which is the most appropriate valve timing for the engine operation state, is set as its target valve timing from the beginning.

Figure 5:
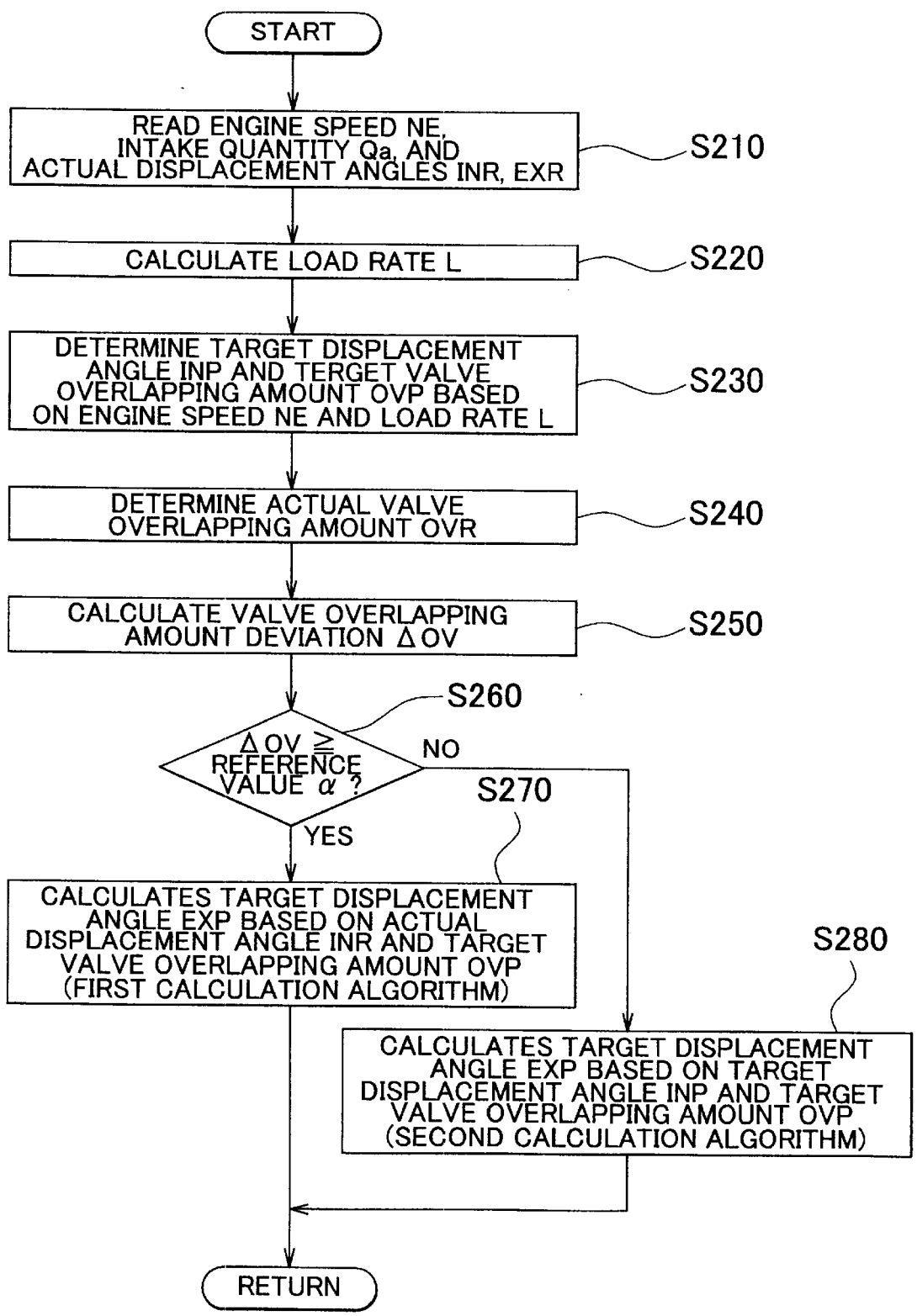
FIG. 5 is a flowchart showing a control procedure executed in a second embodiment of the invention when calculating the target valve timings.

Hereinafter, a procedure to be executed in the embodiment when calculating the target valve timings will be described in detail with reference to a flowchart of FIG. 5. Note that this procedure is executed by the ECU 80 at predetermined time intervals as an interrupt control procedure.

When the procedure starts, the engine speed NE calculated based on the output of the crank angle sensor 41, the intake quantity Qa calculated based on the output of the airflow meter 56, the actual displacement angle INR of the intake-side camshaft 31, and the actual displacement angle EXR of the exhaust-side camshaft 32 are first read (step S210). Note that the actual displacement angle EXR represents, like the actual displacement angle INR, the actual displacement angle of the exhaust-side camshaft 32 as aforementioned.

Next, the load rate L of the gasoline engine 1 under its present operation state is calculated (step S220). Here, the load rate L is calculated by the expression (2) indicated above. Subsequently, the target valve overlapping amount OVP and the target displacement angle INP of the intake-side camshaft 31 are determined on the basis of the engine speed NE and the load rate L using a map or maps stored in the ROM of the ECU 80 (step S230).

Next, an actual valve overlapping amount OVR is calculated by the expression (1) indicated above using the actual displacement angle INR of the intake-side camshaft 31 and the actual displacement angle EXR of the exhaust-side camshaft 32 (step S240).

Then, a valve overlapping amount deviation $\Delta$OV representing a deviation between the actual valve overlapping amount OVR and the target valve overlapping amount OVP is calculated by an expression (4) indicated below (step S250):

$$\Delta OV = OVR - OVP \qquad (4)$$

When reducing the valve overlapping amount in response to changes in the engine operation state, the target valve overlapping amount OVP is made smaller than the actual valve overlapping amount OVR, so the valve overlapping amount deviation $\Delta$OV becomes positive. When increasing the valve overlapping amount, conversely, the target valve overlapping amount OVP is made larger than the actual valve overlapping amount OVR, so the valve overlapping amount deviation $\Delta$OV becomes negative. That is, with the valve overlapping amount deviation $\Delta$OV, as well as a difference between the target valve overlapping amount OVP and the actual valve overlapping amount OVR, a direction in which the valve overlapping amount is changing can also be acknowledged by determining whether the valve overlapping amount deviation $\Delta$OV has a positive or negative sign (i.e., + or −).

Next, it is determined whether the valve overlapping amount deviation $\Delta$OV is equal to or larger than a reference value $\alpha$ (step S260);

$$\Delta OV \geq \text{reference value } \alpha \qquad (5)$$

In the embodiment, the reference value $\alpha$ is set to −2 (° CA).

If it is determined that the valve overlapping amount deviation ΔOV is equal to or larger than the reference value α (step S260: YES), it means that the valve overlapping amount deviation ΔOV is positive and the valve overlapping amount is being reduced or the increase amount of the valve overlapping amount is equal to or smaller than −2° CA. In this case, the target displacement angle EXP of the exhaust-side camshaft 32 is calculated based on the target valve overlapping amount OVP and the actual displacement angle INR of the intake-side camshaft 31 by the expression (3) indicated above in the first embodiment (Step S270).

Conversely, if it is determined that the valve overlapping amount deviation ΔOV is smaller than the reference value α (step S260: NO), it means that the valve overlapping amount deviation ΔOV holds a large negative value and the valve overlapping amount is being increased. In this case, the target displacement angle EXP of the exhaust-side camshaft 32 is calculated based on the target valve overlapping amount OVP and the target displacement angle INP of the intake-side camshaft 31 by an expression (6) indicated below (Step S280);

$$EXP=OVP-(INP+OV_0) \quad (6)$$

Note that an initial value "$OV_0$" is the same as that indicated above in the first embodiment. The expression (6) is obtained by replacing the actual displacement angle INR with the target displacement angle INP in the expression (3) indicated above.

Afterwards, the processes in steps S210 to 280 are repeatedly executed at predetermined time intervals, and the respective VVT mechanisms 60a, 60b, as in the first embodiment, are respectively controlled such that the actual displacement angles INR, EXR of the camshafts 31, 32 match the target displacement angles INP, EXP determined in the above-described procedure.

By the way, when the valve overlapping amount is being reduced by the valve condition control system of the embodiment or when the increase amount of the valve overlapping amount is equal to or smaller than 2° CA, the valve timing of each valve and the valve overlapping amount are changed in the same manner as represented in FIG. 4a so that a required valve overlapping amount is promptly achieved while the phase of the camshafts 31, 32 are still changing. For example, in the case where the valve overlapping amount is to be reduced after the load on the gasoline engine 1 has become small, a target valve overlapping amount corresponding to that small load is promptly obtained while changing the phases of the camshafts 31, 32. Thus, the valve overlapping amount does not become excessively large during the phase changes of the camshafts 31, 32, whereby misfires, or the like, which may otherwise be caused due to an unstable engine combustion, can be prevented or suppressed. Also, in the second embodiment, upon increasing the valve overlapping amount, if its increase amount is equal to or smaller than 2° CA, priority is given to achieving the target valve overlapping amount during the phase changes. This is because, when the increase amount of the valve overlapping amount is that small, it is expected that the engine output will not largely increase if priority is given to achieving a target valve timing of the exhaust valve 18. In such a case, therefore, priority is given, as opposed to increasing the engine output, to preventing or suppressing problems which may otherwise be caused by an inappropriate reduction in the valve overlapping amount during the phase changes.

Figure 6:
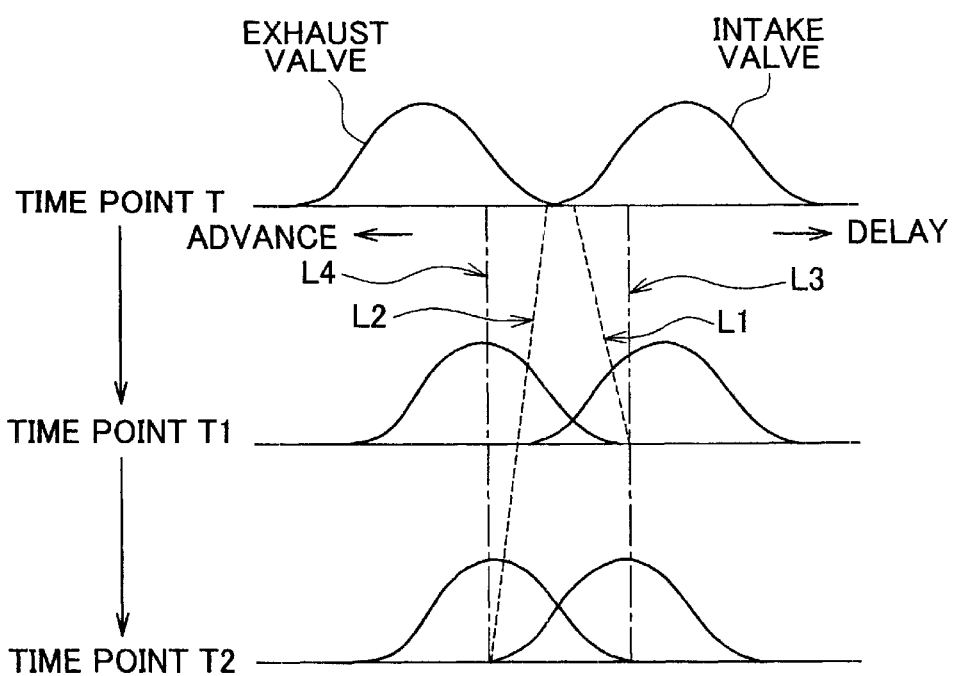
FIG. 6 is a view showing a state of the valve timing control performed by the valve condition control system of the second embodiment when calculating the target valve timings using a second calculation algorithm.
Figure 7:
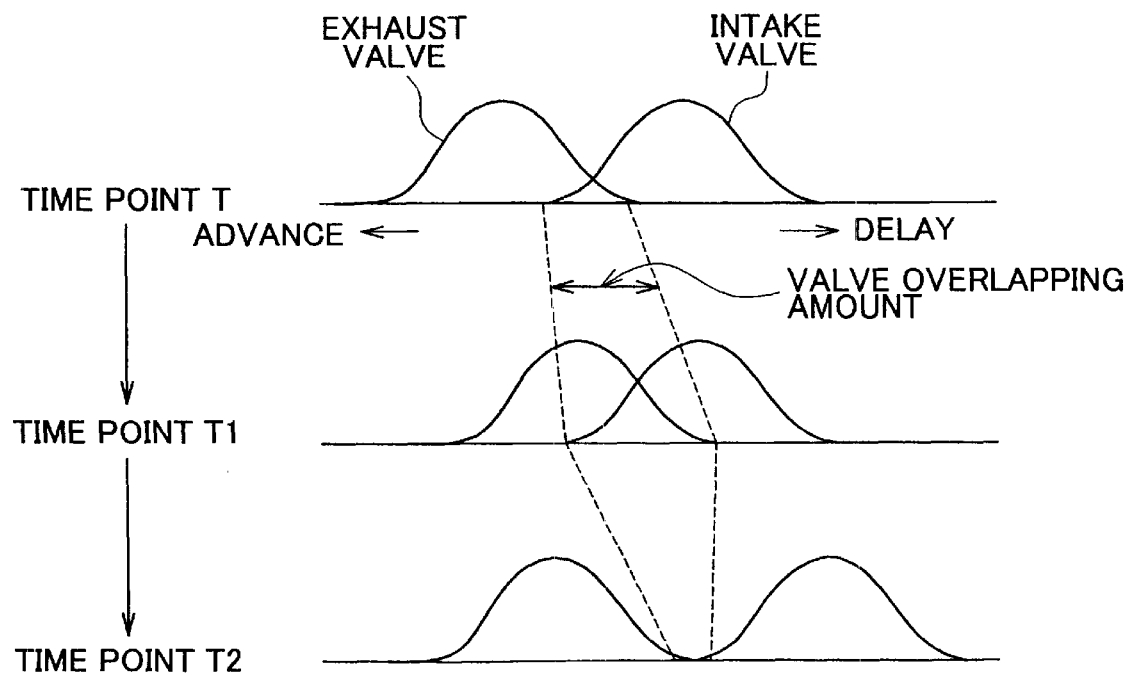
FIG. 7 is a view showing a state of the valve timing control performed by a conventional valve condition control system when controlling the valve timings of the intake and exhaust valves.

When the valve overlapping amount is increased by the valve condition control system of the second embodiment, the valve timings of the respective valves and the valve overlapping amount change as represented in FIG. 6. Lines L1 to L4 of FIG. 6 are the same as those of FIG. 4. According to the second calculation algorithm in the second embodiment, as in the case of the target displacement angle INP of the intake-side camshaft 31, the target displacement angle EXP of the exhaust-side camshaft 32 is set to a displacement angle which will be reached when the phase changes corresponding to the present engine operation state end. With this arrangement, as is apparent when making a comparison between the line L1 of FIG. 6 and that of the FIG. 4b, the phase of the exhaust-side camshaft 32 can be more promptly brought to the displacement angle to be reached when the phase changes corresponding to the present engine operation state end, therefore an appropriate valve timing of the exhaust valve 18 corresponding to changes in the engine operation state can be promptly achieved. Namely, in this procedure, priority is given to achieving the target valve timing of the exhaust valve 18 over achieving the valve overlapping amount during the phase changes of the camshafts 31, 32. For example, when the engine output is to be increased after the load on the gasoline engine 1 has become large, a valve timing of the exhaust valve 18 that is most suitable for making the pressure in the exhaust port 13 lower than the pressure in the intake port 12 is promptly assured to improve the gas charging efficiency of each cylinder.

Consequently, with the valve condition control system according to the second embodiment, the following effects and advantages can be obtained.

The calculating means for calculating the target displacement angle EXP of the exhaust-side camshaft 32 is switched between two calculating means in accordance with the engine operation state, more specifically in accordance with the direction in which the engine operation state requires the valve overlapping amount to change. Thus, the engine operation state can be controlled in a more preferable fashion at the time of changing valve timings.

(Other Embodiments)

Hereinafter, modification examples of the first and second embodiments will be described. Note that effects and advantages that are the same as or equivalent to those in the embodiments can be achieved when the following modifications are made to them.

To begin with, the first embodiment may be modified such that the target displacement angle EXP of the exhaust-side camshaft 32 is determined based on the engine operation state and the target displacement angle INP of the intake-side camshaft 31 is calculated based on the target valve overlapping amount OVP and the actual displacement angle EXR of the exhaust-side camshaft 32. Likewise, the second embodiment may be modified such that the target displacement angle EXP of the exhaust-side camshaft 32 is determined based on the engine operation state and the target displacement angle INP of the intake-side camshaft 31 is calculated based on the target valve overlapping amount OVP and the target displacement angle EXP of the exhaust-side camshaft 32. Also in these cases, effects and advantages that are the same as or equivalent to those in the respective embodiments can be achieved.

Also, while displacement angles are used as parameters for detecting the valve timings of the intake and exhaust valves 17, 18 in the above embodiments, other parameters representing those valve timings may be used.

Also, while the reference value a is set to −2° CA in the second embodiment, the reference value α is not limited to −2° CA but may be set as needed for enabling the calculating means to be appropriately switched between the first and second calculating means in accordance with the engine operation state.

Also, the second embodiment may be modified such that the target displacement angle EXP of the exhaust-side camshaft 32 is calculated by the first calculation algorithm when the valve overlapping amount deviation $\Delta OV$ is smaller than the reference value $\alpha$ and is calculated by the second calculation algorithm when the valve overlapping amount deviation $\Delta OV$ is equal to or larger than the reference value $\alpha$. With this arrangement, at the time of increasing the valve overlapping amount, the target valve overlapping amount can be achieved during the phase changes, so the internal EGR amount, for example, is promptly increased, whereby NOx can be promptly reduced. At the time of reducing the valve overlapping amount, conversely, a target valve timing can be promptly achieved.

Also, the second embodiment may be modified such that the target displacement angle EXP of the exhaust-side camshaft 32 is calculated by the first calculation algorithm when the engine operation is in an operation region where it is easily effected by the valve overlapping amount, and is calculated by the second calculation algorithm when the engine operation state is in another operation region where it is easily effected by the open-close timing of each valve. With this arrangement, the phases of the intake-side camshaft 31 and the exhaust-side camshaft 32 can be changed in the most appropriate manner for the engine operation state.

In the above-described embodiments, the "valve condition" to be changed by the valve condition control system is an open-close timing of the intake and exhaust valves. However, the application of the valve condition control system according to the invention is not limited to such valve condition control systems, but may be, for example, constructed as a valve condition control system of a type which changes lift stroke and open-close timing of valves. Also, even if the valve condition control system is of a type which only changes the lift stroke of valves and which does not change the open-close timing of valves, the internal EGR amount changes as the lift stroke changes, therefore there is a possibility that the aforementioned problems occur. In such a case, too, effects and advantages that are the same as or equivalent to those in the above-described embodiments may be achieved by performing equivalent controls to those in each embodiment using a parameter which represents specific valve condition, like a valve overlapping amount estimated from the lift stroke and open-close timing of valves.

In the first and second embodiments, the valve condition control system of the invention is applied to the gasoline engine 1. However, the valve condition control system according to each embodiment is not necessarily applied to the gasoline engine 1. That is, it may also be applied to other internal combustion engines of various constructions, each including variable valve drive mechanisms for changing valve conditions of both intake and exhaust valves. In such a case, too, it is possible to obtain effects and advantages that are the same as or equivalent to those in the above-described embodiments.

In addition, technical concepts derived from the above embodiments and modification examples will hereinafter be described with reference to the effects and advantages that can be obtained with those concepts.

(i) A valve condition control system for an internal combustion engine including a first variable valve drive mechanism for changing a valve timing of one of an intake valve and an exhaust valve and a second variable valve drive mechanism for changing a valve timing of the other of the intake valve and the exhaust valve, the valve condition control system being adapted to calculate a target valve timing of each variable valve drive mechanism and to control an operation of each variable valve drive mechanism such that its actual valve timing matches the target valve timing, in which:

an appropriate valve timing of the one of the intake and exhaust valves for an engine operation state is calculated as a target valve timing of the first variable valve drive mechanism;

a target valve overlapping amount is calculated in accordance with the engine operation state;

first target calculating means is provided, which calculates a target valve timing of the second variable valve drive mechanism on the basis of an actual valve timing of the first variable valve drive mechanism and the target valve overlapping amount;

second target calculating means is provided, which calculates valve timings of the first and second variable valve drive mechanisms required for obtaining each appropriate valve timing of the valves for the engine operation state as target control amounts of the first and second variable valve drive mechanisms; and the target valve timings of the valves are calculated by the first calculating means when the engine operation state requires the target valve overlapping amount to be larger than the present valve overlapping amount; and the target valve timings of the valves are calculated by the second calculating means when the engine operation state requires the target valve overlapping amount to be smaller than the present valve overlapping amount.

According to this construction, upon increasing the valve overlapping amount, a required valve overlapping amount can be achieved during the phase change.

According to this construction, further upon reducing the valve overlapping amount, a required valve overlapping amount can be promptly achieved.

(ii) A valve condition control system for an internal combustion engine including a first variable valve drive mechanism for changing a valve condition of one of an intake valve and an exhaust valve and a second variable valve drive mechanism for changing a valve condition of the other of the intake valve and the exhaust valve, the valve condition control system being adapted to calculate a target control amount of each variable valve drive mechanism and to control an operation of each variable valve drive mechanism such that its actual control amount matches the target control amount, in which:

an appropriate valve timing of the one of the intake and exhaust valves for an engine operation state is calculated as a target valve timing of the first variable valve drive mechanism;

a target valve overlapping amount is calculated in accordance with the engine operation state;

first target calculating means is provided, which calculates a target valve timing of the second variable valve drive mechanism on the basis of an actual valve timing of the first variable valve drive mechanism and the target valve overlapping amount;

second target calculating means is provided, which calculates each appropriate valve timing of the valves for the engine operation state as target control amounts of the first and second variable valve drive mechanisms; and the target valve timings of the valves are calculated by the first calculating means when the engine operation is in an operation region where it is easily effected by the valve overlapping amount; and the target valve timings of the valves are calculated by the second calculating means when the engine operation state is in another operation region where it is easily effected by an open-close timing of each valve.

According to this construction, when the engine operation is in an operation region where it is easily effected by the valve overlapping amount, a required valve overlapping amount can be achieved during the phase change. Conversely, when the engine operation is in an operation region where it is easily effected by the open-close timing of each valve, an appropriate open-close timing of each valve for the engine operation can be quickly achieved. Thus, the valve timings of the intake and exhaust valves are changed in an appropriate manner for the engine operation state, so an appropriate engine operation state is maintained at the time of changing valve timings.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A control method of a valve condition control system for an internal combustion engine including a first variable valve drive mechanism for changing a valve condition of one of an intake valve and an exhaust valve and a second variable valve drive mechanism for changing a valve condition of the other of the intake valve and the exhaust valve, the valve condition control system being adapted to calculate a target control amount of each variable valve drive mechanism and to control an operation of each variable valve drive mechanism such that its actual control amount matches the target control amount, the control method comprising the steps of:

calculating the control amount of the first variable valve drive mechanism required for obtaining an appropriate valve condition of one of the intake and exhaust valves for an engine operation state as a target control amount of the first variable valve drive mechanism;

calculating a target valve overlapping amount between the intake and exhaust valves in accordance with the engine operation state; and calculating the target control amount of the second variable valve drive mechanism on the basis of an actual control amount of the first variable valve drive mechanism and the target valve overlapping amount.

2. The control method according to claim 1, wherein:
the valve condition comprises a valve timing;
the target control amount comprises a target valve timing; and
the actual control amount comprises an actual valve timing.

3. The control method according to claim 2, wherein:
each variable valve drive mechanism changes a valve timing of the valve by changing a relative phase of a camshaft, for driving the valve to open and close, with respect to a crank shaft.

4. A valve condition control system for an internal combustion engine, comprising:

a first variable valve drive mechanism that changes a valve condition of one of an intake valve and an exhaust valve of the internal combustion engine;

a second variable valve drive mechanism that changes a valve condition of the other of the intake valve and the exhaust valve; and a controller that calculates a control amount of the first variable valve drive mechanism required for obtaining an appropriate valve condition of the one of the intake and exhaust valves for an engine operation state as a target control amount of the first variable valve drive mechanism;

calculates a target valve overlapping amount between the intake and exhaust valves in accordance with the engine operation state;

calculates a target control amount of the second variable valve drive mechanism on the basis of an actual control amount of the first variable valve drive mechanism and the target valve overlapping amount; and controls an operation of each variable valve drive mechanism such that its actual control amount matches the target control amount.

5. The valve condition control system according to claim 4, wherein:
the valve condition comprises a valve timing;
the target control amount comprises a target valve timing; and
the actual control amount comprises an actual valve timing.

6. The valve condition control system according to claim 5, wherein:
each variable valve drive mechanism changes a valve timing of the valve by changing a relative phase of a camshaft, which drives the valve to open and close, with respect to a crank shaft.

7. A control method of a valve condition control system for an internal combustion engine including a first variable valve drive mechanism for changing a valve condition of one of an intake valve and an exhaust valve and a second variable valve drive mechanism for changing a valve condition of the other of the intake valve and the exhaust valve, the valve condition control system being adapted to calculate a target control amount of each variable valve drive mechanism and to control an operation of each variable valve drive mechanism such that its actual control amount matches the target control amount, the control method comprising the steps of:

calculating a control amount of the first variable valve drive mechanism required for obtaining an appropriate valve condition of one of the intake and exhaust valves for an engine operation state as a first target control amount of the first variable valve drive mechanism;

calculating a target valve overlapping amount between the intake and exhaust valves in accordance with the engine operation state;

calculating a first target control amount of the second variable valve drive mechanism on the basis of an actual control amount of the first variable valve drive mechanism and the target valve overlapping amount;

calculating control amounts of the first and second variable valve drive mechanisms required for obtaining each appropriate valve condition of the valves for the engine operation state as second target control amounts; and selecting target control amounts of the first and second variable valve drive mechanisms from the first and second target control amounts of each of the first and second variable valve drive mechanisms in accordance with the engine operation state at the time of calculating target control amounts of the first and second variable valve drive mechanisms.

8. The control method according to claim 7, wherein:

the first target control amount is used when the engine operation state requires the target valve overlapping amount to be smaller than a present valve overlapping amount; and the second target control amounts are used when the engine operation state requires the target valve overlapping amount to be larger than the present valve overlapping amount.

9. The control method according to claim 7, wherein:

the valve condition comprises a valve timing;

the target control amount comprises a target valve timing; and the actual control amount comprises an actual valve timing.

10. The control method according to claim 9, wherein:

the first target control amount is used when the engine operation state requires the target valve overlapping amount to be smaller than a present valve overlapping amount; and the second target control amounts are used when the engine operation state requires the target valve overlapping amount to be larger than the present valve overlapping amount.

11. The control method according to claim 9, wherein:

each variable valve drive mechanism changes a valve timing of the valve by changing a relative phase of a camshaft, for driving the valve to open and close, with respect to a crank shaft.

12. A valve condition control system for an internal combustion engine, comprising:

a first variable valve drive mechanism that changes a valve condition of one of an intake valve and an exhaust valve of the internal combustion engine;

a second variable valve drive mechanism that changes a valve condition of the other of the intake valve and the exhaust valve; and a controller that calculates a control amount of the first variable valve drive mechanism required for obtaining an appropriate valve condition of the one of the intake and exhaust valves for an engine operation state as a first target control amount of the first variable valve drive mechanism;

calculates a target valve overlapping amount between the intake and exhaust valves in accordance with the engine operation state;

calculates a first target control amount of the second variable valve drive mechanism on the basis of an actual control amount of the first variable valve drive mechanism and the target valve overlapping amount;

calculates control amounts of the first and second variable valve drive mechanisms required for obtaining each appropriate valve condition of the valves for the engine operation state as second target control amounts;

selects target control amounts of the first and second variable valve drive mechanisms from the first and second target control amounts of each of the first and second variable valve drive mechanisms in accordance with the engine operation state at the time of calculating target control amounts of the first and second variable valve drive mechanisms; and controls operations of the first and second variable valve drive mechanisms such that their actual control amounts match the target control amounts calculated.

13. The valve condition control system according to claim 12, wherein:

the controller controls the operation of each valve using the first target control amount when the engine operation state requires the target valve overlapping amount to be smaller than a present valve overlapping amount; and the controller controls the operation of each valve using the second target control amount when the engine operation state requires the target valve overlapping amount to be larger than the present valve overlapping amount.

14. The valve condition control system according to claim 12, wherein:

the valve condition comprises a valve timing;

the target control amount comprises a target valve timing; and the actual control amount comprises an actual valve timing.

15. The valve condition control system according to claim 14, wherein:

the controller controls the operation of each valve using the first target control amount when the engine operation state requires the target valve overlapping amount to be smaller than a present valve overlapping amount; and the controller controls the operation of each valve using the second target control amounts when the engine operation state requires the target valve overlapping amount to be larger than the present valve overlapping amount.

16. The valve condition control system according to claim 14, wherein:

each variable valve drive mechanism changes a valve timing of the valve by changing a relative phase of a camshaft, which drives the valve to open and close, with respect to a crank shaft.

17. A control method of a valve condition control system for an internal combustion engine including a first variable valve drive mechanism for changing a valve condition of one of an intake valve and an exhaust valve and a second variable valve drive mechanism for changing a valve condition of the other of the intake valve and the exhaust valve, the valve condition control system being adapted to calculate a target control amount of each variable valve drive mechanism and to control an operation of each variable valve drive mechanism such that its actual control amount matches the target control amount, the control method comprising the steps of:

calculating a control amount of the first variable valve drive mechanism required for obtaining an appropriate valve condition of one of the intake and exhaust valves for an engine operation state as a target control amount of the first variable valve drive mechanism;

calculating a target valve overlapping amount between the intake and exhaust valves in accordance with the engine operation state;

calculating a first target control amount of the second variable valve drive mechanism on the basis of an actual control amount of the first variable valve drive mechanism and the target valve overlapping amount;

calculating a second target control amount of the second variable valve drive mechanism on the basis of the target control amount of the first variable valve drive mechanism and the target valve overlapping amount; and selecting target control amounts of the second variable valve drive mechanisms from the first and second target control amounts of the second variable valve drive mechanisms in accordance with the engine operation state at the time of calculating target control amounts of the first and second variable valve drive mechanisms.

18. A valve condition control system for an internal combustion engine, comprising:

a first variable valve drive mechanism that changes a valve condition of one of an intake valve and an exhaust valve of the internal combustion engine;

a second variable valve drive mechanism that changes a valve condition of the other of the intake valve and the exhaust valve; and a controller that calculates a control amount of the first variable valve drive mechanism required for obtaining an appropriate valve condition of the one of the intake and exhaust valves for an engine operation state as a target control amount of the first variable valve drive mechanism;

calculates a target valve overlapping amount between the intake and exhaust valves in accordance with the engine operation state;

calculates a first target control amount of the second variable valve drive mechanism on the basis of an actual control amount of the first variable valve drive mechanism and the target valve overlapping amount;

calculates a second target control amount of the second variable valve drive mechanism on the basis of the target control amount of the first variable valve drive mechanism and the target valve overlapping amount;

selects target control amounts of the second variable valve drive mechanisms from the first and second target control amounts of the second variable valve drive mechanisms in accordance with the engine operation state at the time of calculating target control amounts of the first and second variable valve drive mechanisms; and controls operations of the first and second variable valve drive mechanisms such that their actual control amounts match the target control amounts calculated.

* * * * *

UNITED STATES PATENT AND TRADEMARK OFFICE
CERTIFICATE OF CORRECTION

PATENT NO.    : 6,679,206 B2
DATED         : January 20, 2004
INVENTOR(S)   : Noboru Takagi It is certified that error appears in the above-identified patent and that said Letters Patent is hereby corrected as shown below:

<u>Title page,</u>
Item [73], should read as follows:
-- [73]   Assignee:        Toyota Jidosha Kabushiki Kaisha, Toyota (JP) --.

Signed and Sealed this

Twenty-second Day of June, 2004

JON W. DUDAS
*Acting Director of the United States Patent and Trademark Office*